(12) United States Patent
Lu et al.

(10) Patent No.: US 12,336,073 B2
(45) Date of Patent: Jun. 17, 2025

(54) LIGHTING DEVICE PROTECTION CIRCUIT HAVING HIGH VOLTAGE ENDURANCE ABILITY

(71) Applicant: Xiamen PVTECH Co., Ltd., Fujian (CN)

(72) Inventors: Fuxing Lu, Fujian (CN); Bohao Zhang, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 100 days.

(21) Appl. No.: 18/231,743

(22) Filed: Aug. 8, 2023

(65) Prior Publication Data
US 2024/0334571 A1  Oct. 3, 2024

(30) Foreign Application Priority Data
Mar. 27, 2023  (CN) .......................... 202310303030.9

(51) Int. Cl.
*H05B 45/30* (2020.01)
*H05B 45/54* (2020.01)
*H05B 47/24* (2020.01)

(52) U.S. Cl.
CPC ............. *H05B 45/54* (2020.01); *H05B 45/30* (2020.01); *H05B 47/24* (2020.01)

(58) Field of Classification Search
CPC ........ H05B 45/30; H05B 45/54; H05B 45/50; H05B 45/59; H05B 47/20; H05B 47/24
See application file for complete search history.

(56) References Cited

U.S. PATENT DOCUMENTS

| 9,750,108 B2* | 8/2017 | Lin | H05B 45/56 |
| 2011/0304943 A1* | 12/2011 | Barton | H02H 9/042 |
| | | | 361/104 |
| 2020/0191337 A1* | 6/2020 | Janik | F21V 29/70 |

FOREIGN PATENT DOCUMENTS

| CN | 204905855 U | 12/2015 |
| CN | 217160076 U | 8/2022 |

* cited by examiner

*Primary Examiner* — Thai Pham
(74) *Attorney, Agent, or Firm* — Winston Hsu

(57) ABSTRACT

A lighting device protection circuit includes an input module, a rectifying module, a driving module and a varistor. The input module includes a positive electrode input end and a negative electrode input end. The rectifying module has a first end, a second end, a third end and a fourth end; the first end, the second end and the third end are connected to the positive electrode input end, a first node and the negative electrode input end respectively. The first node is connected to a grounding point. The driving module has a first pin, a second pin, a third pin and a fourth pin, which are connected to the fourth end, the first node, a second node and the positive electrode of a LED module respectively. The second node is connected to the negative electrode of the LED module. The varistor is connected to the LED module in series.

9 Claims, 4 Drawing Sheets

LIGHTING DEVICE PROTECTION CIRCUIT HAVING HIGH VOLTAGE ENDURANCE ABILITY

BACKGROUND OF THE INVENTION

1. Field of the Invention

The present invention relates to a lighting device protection circuit, in particular to a lighting device protection circuit having high voltage endurance ability.

2. Description of the Prior Art

Varistors can be used as surge protection resistors for the protection circuits of lighting devices. A varistor is usually installed at the input end of a lighting device protection circuit. When the surge voltage exceeds the voltage endurance ability of the varistor, the breakdown of the varistor would be incurred in order to prevent the surge voltage from damaging other electronic components of the lighting device. However, the currently available lighting device protection circuit still has several disadvantages. First, the input end of the lighting device protection circuit needs a varistor with high voltage endurance ability so as to effectively suppress the surge voltage. In addition, the varistor with high voltage endurance will increase the cost of the lighting device. Further, when the surge voltage is generated, the electronic components (such as chips, power resistors, etc.) of the lighting device protection circuit are easily burned out and sparks are generated.

China Patent Publication No. CN111479354A, China Patent Publication No. CN113163549A and US Patent Publication No. US2020/0191337A1 also disclose surge protection circuits for lighting devices, but these surge protection circuits still cannot effectively solve the above problems of prior art.

SUMMARY OF THE INVENTION

One embodiment of the present invention provides a lighting device protection circuit having high voltage endurance ability, which includes an input module, a rectifying module, a driving module and a varistor. The input module is connected to an external power source, and includes a positive electrode input end and a negative electrode input end. The rectifying module has a first end, a second end, a third end and a fourth end. The first end is connected to the positive electrode input end. The second end is connected to a first node. The third end is connected to the negative electrode input end. The first node is connected to a grounding point. The driving module has a first pin, a second pin, a third pin and a fourth pin. The first pin is connected to the fourth end. The second pin is connected to the first node. The third pin is connected to a second node. The fourth pin is connected to the positive electrode of a light-emitting diode (LED) module. The second node is connected to the negative electrode of the LED module. The varistor is connected to the LED module in series, and the two ends of the varistor are connected to the first node and the second node respectively.

In one embodiment, the total voltage endurance value of a circuit module formed by connecting the varistor to the LED module in series is the sum of the voltage endurance value of the varistor and the clamping voltage of the LED module.

In one embodiment, when the surge voltage received by the input module is greater than the total voltage endurance value, the varistor enters the on state, such that a path is formed between the first node and the second node, and the rectifying module enters the short-circuited state.

In one embodiment, the lighting device protection circuit further includes a fuse disposed between the first end of the rectifying module and the positive electrode input end of the input module.

In one embodiment, the varistor is a symmetric varistor or a non-symmetric varistor.

In one embodiment, the rectifying module is a bridge rectifier.

In one embodiment, the driving module is a LED driver.

In one embodiment, the LED module is a LED or a LED array.

In one embodiment, the LED module includes a plurality of LEDs connected to each other in series.

In one embodiment, the external power source is a utility power.

The lighting device protection circuit having high voltage endurance ability in accordance with the embodiments of the present invention may have the following advantages:

(1) In one embodiment of the present invention, the lighting device protection circuit includes an input module, a rectifying module, a driving module and a varistor. The varistor is connected to a LED module in series. Thus, the total voltage endurance voltage of the circuit module formed by connecting the varistor to the LED module in series is the sum of the voltage endurance value of the varistor and the clamping voltage of the LED module. When the input module receives a surge voltage, the clamping voltage of the LED module can bear a part of the surge voltage, such that the varistor and the LED module can share the surge voltage. Therefore, the lighting device protection circuit can achieve high total voltage endurance value even if the voltage endurance value of the varistor thereof is low. Accordingly, the lighting device protection circuit can effectively suppress the surge voltage.

(2) In one embodiment of the present invention, the varistor of the lighting device protection circuit is connected to the LED module in series. Therefore, the clamping voltage of the LED module can bear a part of the surge voltage, such that the varistor and the LED module can share the surge voltage. As a result, the lighting device protection circuit can achieve high total voltage endurance value even if the voltage endurance value of the varistor thereof is low. Therefore, the cost of the lighting device protection circuit can be greatly decreased.

(3) In one embodiment of the present invention, the varistor of the lighting device protection circuit is connected to the LED module in series. Thus, the clamping voltage of the LED module can bear a part of the surge voltage, such that the varistor and the LED module can share the surge voltage. Thus, the lighting device protection circuit can achieve high total voltage endurance value even if the voltage endurance value of the varistor thereof is low, which can effectively avoid that the lighting device protection circuit and the electronic components of the lighting device are burned out. Thus, the safety of the lighting device protection circuit can be enhanced, so the lighting device protection circuit can meet actual requirements.

(4) In one embodiment of the present invention, when the input module of the lighting device protection circuit receives the surge voltage and the surge voltage is greater than the total voltage endurance value, the varistor can enter the on state to form a path between the first node and the second node. Thus, the rectifying module can enter the short-circuited state. The above mechanism can effectively avoid that the lighting device protection circuit and the electronic components of the lighting device are burned out due to high surge voltage. Therefore, the safety of the lighting device protection circuit can be further enhanced.

(5) In one embodiment of the present invention, the design of the lighting device protection circuit is simple, so the lighting device protection circuit can achieve the desired technical effects without significantly increasing the cost thereof.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
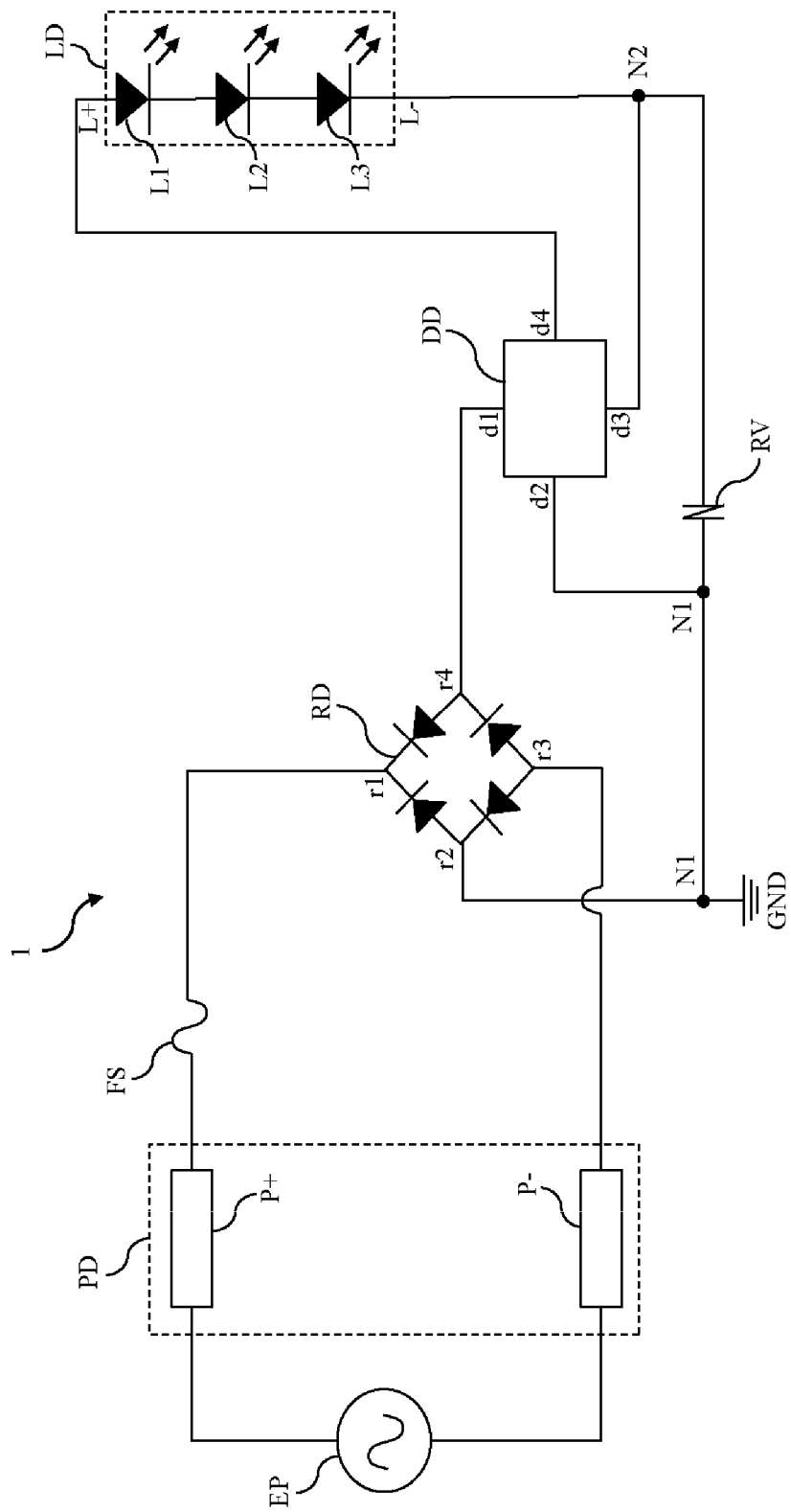
FIG. 1 is a circuit diagram of a lighting device protection circuit having high voltage endurance ability in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a circuit diagram of a lighting device protection circuit having high voltage endurance ability in accordance with one embodiment of the present invention. As shown in FIG. 1, the lighting device protection circuit 1 includes an input module PD, a fuse FS, a rectifying module RD, a driving module DD and a varistor RV.

The input module PD is connected to an external power source EP. The input module PD includes a positive electrode input end P+ and a negative electrode input end P−. In the embodiment, the external power source EP is a utility power. In another embodiment, the external power source EP is a generator, a renewable energy power generation system or other similar devices.

The rectifying module RD has a first end r1, a second end r2, a third end r3 and a fourth end r4. The first end r1 of the rectifying module RD is connected to the positive electrode input end P+ of the input module PD. The fuse FS is disposed between the first end r1 of the rectifying module RD and the positive electrode input end P+ of the input module PD. In other words, one end of the fuse FS is connected to the first end r1 of the rectifying module RD, and the other end of the fuse FS is connected to the positive electrode input end P+ of the input module PD. The second end r2 of the rectifying module RD is connected to the first node N1. The third end r3 of the rectifying module RD is connected to the negative electrode input end P− of the input module PD. The first node N1 is connected to a grounding point GND. In one embodiment, the rectifying module RD may be a bridge rectifier, such as a full-wave rectifier having several diodes. In another embodiment, the rectifying module RD may be a half-wave rectifier or other similar devices. The driving module DD has a first pin d1, a second pin d2, a third pin d3 and a fourth pin d4. The first pin d1 of the driving module DD is connected to the fourth end r4 of the rectifying module RD. The second pin d2 of the driving module DD is connected to the first node N1. The third pin d3 of the driving module DD is connected to the second node N1. The fourth pin d4 of the driving module DD is connected to the positive electrode L+ of the light-emitting diode (LED) module LD, and the second node N2 is connected to the negative electrode L− of the LED module LD. The driving module DD is a LED driver circuit. The circuit structure of the LED driver circuit is known by those skilled in the art, so will not be described herein again. In the embodiment, the LED module LD is a LED array, which may include several LEDs L1, L2, L3 connected to each other in series. In another embodiment, the LED module LD may include only one LED.

The varistor RV is connected to the LED module LD in series. The two ends of the varistor RVC are connected to the first node N1 and the second node N2 respectively. The varistor RV may be, but not limited to, a ZnO varistor, a SiC varistor, a metal dioxide varistor, a Ge (SiC) varistor, a BaTiO3 varistor. In one embodiment, the varistor RV may be a symmetric varistor. In another embodiment, the varistor RV may be a non-symmetric varistor.

As set forth above, via the series-connected circuit structure integrating the varistor RV and the load (the LED module LD), the total voltage endurance value of the circuit module (formed by connecting the varistor RV to the LED module LD in series) is the sum of the voltage endurance value of the varistor RV and the clamping voltage of the LED module LD. When the input module PD receives a surge voltage, the LED module LD can perform clamping so as to bear a part of the surge voltage. Thus, the varistor RV and the LED module LD can share the surge voltage.

Via the above circuit design, the lighting device protection circuit 1 can achieve high total voltage endurance value even if the voltage endurance value of the varistor RV thereof is low. Accordingly, the lighting device protection circuit 1 can effectively suppress the surge voltage, which can effectively avoid that the lighting device protection circuit 1 and the electronic components of the lighting device are burned out. Thus, the safety of the lighting device protection circuit 1 can be enhanced, so the lighting device protection circuit can meet actual requirements. In addition, the cost of the lighting device protection circuit 1 can be greatly reduced.

Further, the design of the lighting device protection circuit 1 is simple, so the lighting device protection circuit 1 can achieve the desired technical effects without significantly increasing the cost thereof.

Figure 2:
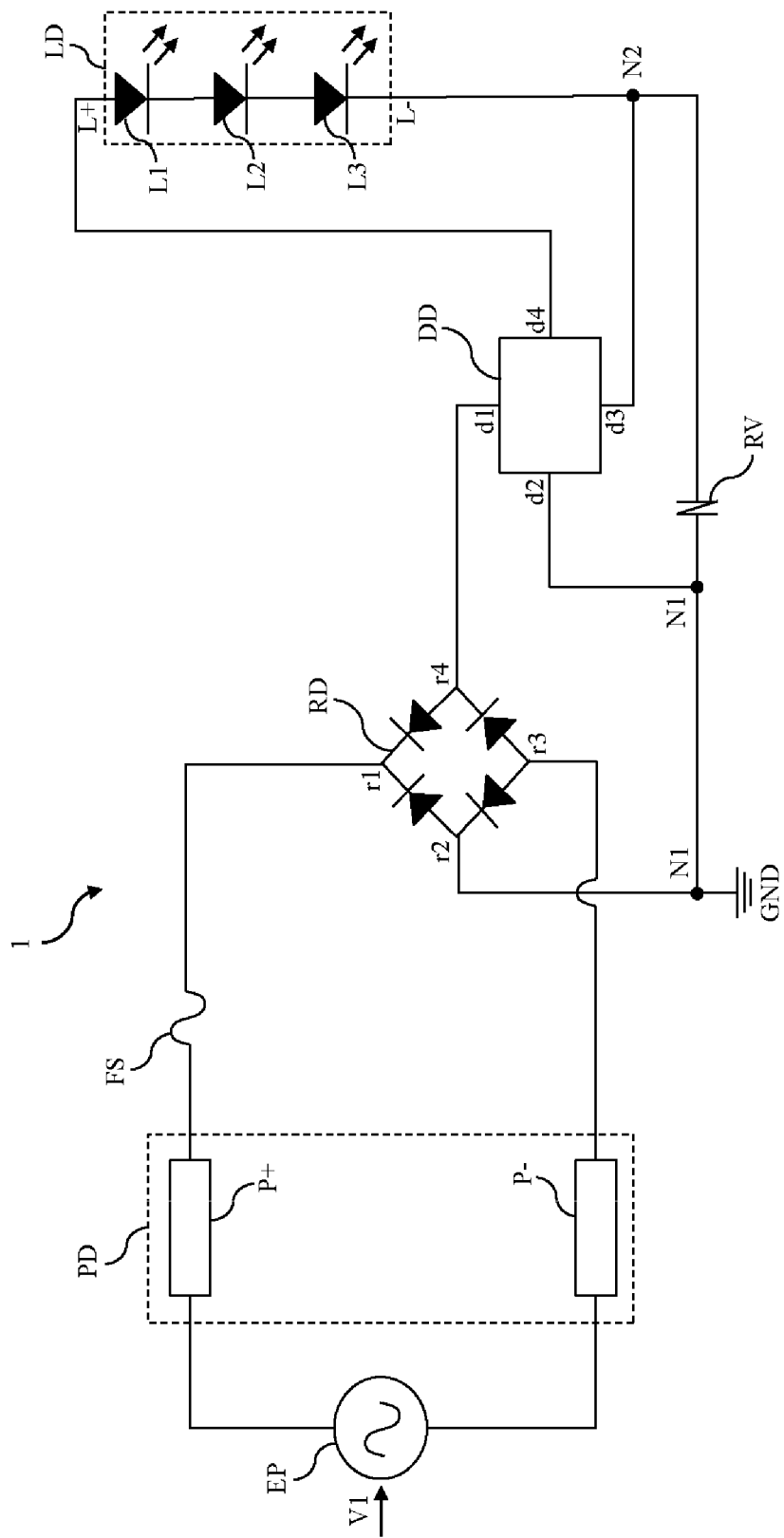
FIG. 2 is a schematic view of a first operational state of the lighting device protection circuit having high voltage endurance ability in accordance with one embodiment of the present invention.

Please refer to FIG. 2, which is a schematic view of a first operational state of the lighting device protection circuit having high voltage endurance ability in accordance with one embodiment of the present invention. As shown in FIG. 2, when the input module PD receives a surge voltage V1, the LED module LD can perform clamping to bear a part of the surge voltage V1. In the meanwhile, the varistor RV and the LED module LD can share the surge voltage V1. If the varistor RV has not been penetrated through, the maximal value of the surge voltage V1 which the circuit module (formed by connecting the varistor RV to the LED module LD in series) can bear is as shown in Equation (1) given below:

$$V1 = Vled + Vrv \quad (1)$$

In Equation (1), V1 stands for the surge voltage (less than the voltage endurance value of the rectifying module RD); Vled stands for the clamping voltage of the LED module LD; Vrv stands for the voltage endurance of the varistor RV.

As described above, the LED module LD can execute clamping in order to bear a part of the surge volage V1. Therefore, the lighting device protection circuit 1 can achieve high total voltage endurance value even if the voltage endurance value of the varistor RV thereof is low. Accordingly, the lighting device protection circuit 1 can effectively suppress the surge voltage V1.

The embodiment just exemplifies the present invention and is not intended to limit the scope of the present invention; any equivalent modification and variation according to the spirit of the present invention is to be also included within the scope of the following claims and their equivalents.

Figure 3:
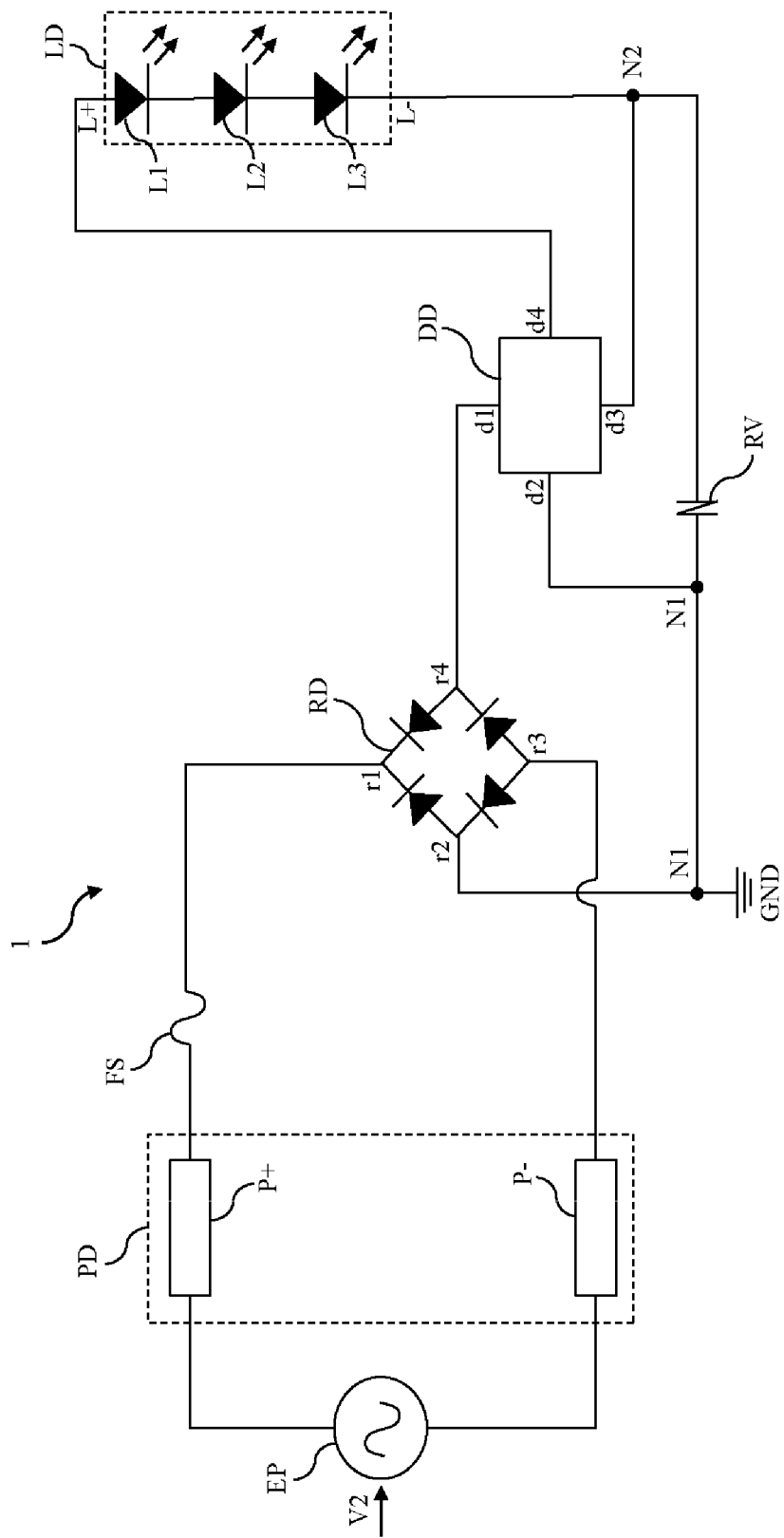
FIG. 3 is a schematic view of a second operational state of the lighting device protection circuit having high voltage endurance ability in accordance with one embodiment of the present invention.

Please refer to FIG. 3, which is a schematic view of a second operational state of the lighting device protection circuit having high voltage endurance ability in accordance with one embodiment of the present invention. As shown in FIG. 3, when the surge voltage V2 received by the input module PD is greater than the total voltage endurance value, the varistor RV enters the on state, so a path is formed between the first node N1 and the second node N2. In this case, the rectifying module RD enters the short-circuited state, as shown in Equation (2) given below:

$$V2 > Vled + Vrv \quad (2)$$

In Equation (2), V2 stands for the surge voltage; Vled stands for the clamping voltage of the LED module LD; Vrv stands for the voltage endurance of the varistor RV.

As described above, when the input module PD of the lighting device protection circuit 1 receives the surge voltage V2 and the surge voltage V2 is greater than the total voltage endurance value, the varistor RV enters the on state to form a path between the first node N1 and the second node N2. Meanwhile, the rectifying module RD enters the short-circuited state. The above mechanism can effectively avoid that the lighting device protection circuit 1 and the electronic components of the lighting device are burned out due to excessive surge voltage. As a result, the safety of the lighting device protection circuit 1 can be further enhanced.

The embodiment just exemplifies the present invention and is not intended to limit the scope of the present invention; any equivalent modification and variation according to the spirit of the present invention is to be also included within the scope of the following claims and their equivalents.

It is worthy to point out that the input end of a currently available lighting device protection circuit needs a varistor with high voltage endurance ability so as to effectively suppress the surge voltage. Besides, the varistor with high voltage endurance will increase the cost of the lighting device. Further, when the surge voltage is generated, the electronic components (such as chips, power resistors, etc.) of the lighting device protection circuit are easily burned out and sparks are generated. On the contrary, according to one embodiment of the present invention, the lighting device protection circuit includes an input module, a rectifying module, a driving module and a varistor. The varistor is connected to a LED module in series. Thus, the total voltage endurance voltage of the circuit module formed by connecting the varistor to the LED module in series is the sum of the voltage endurance value of the varistor and the clamping voltage of the LED module. When the input module receives a surge voltage, the clamping voltage of the LED module can bear a part of the surge voltage, such that the varistor and the LED module can share the surge voltage. Therefore, the lighting device protection circuit can achieve high total voltage endurance value even if the voltage endurance value of the varistor thereof is low. Accordingly, the lighting device protection circuit can effectively suppress the surge voltage.

Also, according to one embodiment of the present invention, the varistor of the lighting device protection circuit is connected to the LED module in series. Therefore, the clamping voltage of the LED module can bear a part of the surge voltage, such that the varistor and the LED module can share the surge voltage. As a result, the lighting device protection circuit can achieve high total voltage endurance value even if the voltage endurance value of the varistor thereof is low. Therefore, the cost of the lighting device protection circuit can be greatly decreased.

Further, according to one embodiment of the present invention, the varistor of the lighting device protection circuit is connected to the LED module in series. Thus, the clamping voltage of the LED module can bear a part of the surge voltage, such that the varistor and the LED module can share the surge voltage. Thus, the lighting device protection circuit can achieve high total voltage endurance value even if the voltage endurance value of the varistor thereof is low, which can effectively avoid that the lighting device protection circuit and the electronic components of the lighting device are burned out. Thus, the safety of the lighting device protection circuit can be enhanced, so the lighting device protection circuit can meet actual requirements.

Moreover, according to one embodiment of the present invention, when the input module of the lighting device protection circuit receives the surge voltage and the surge voltage is greater than the total voltage endurance value, the varistor can enter the on state to form a path between the first node and the second node. Thus, the rectifying module can enter the short-circuited state. The above mechanism can effectively avoid that the lighting device protection circuit and the electronic components of the lighting device are burned out due to high surge voltage. Therefore, the safety of the lighting device protection circuit can be further enhanced.

Furthermore, according to one embodiment of the present invention, the design of the lighting device protection circuit is simple, so the lighting device protection circuit can achieve the desired technical effects without significantly increasing the cost thereof. As described above, the lighting device protection circuit according to the embodiments of the present invention can definitely achieve great technical effects.

Figure 4:
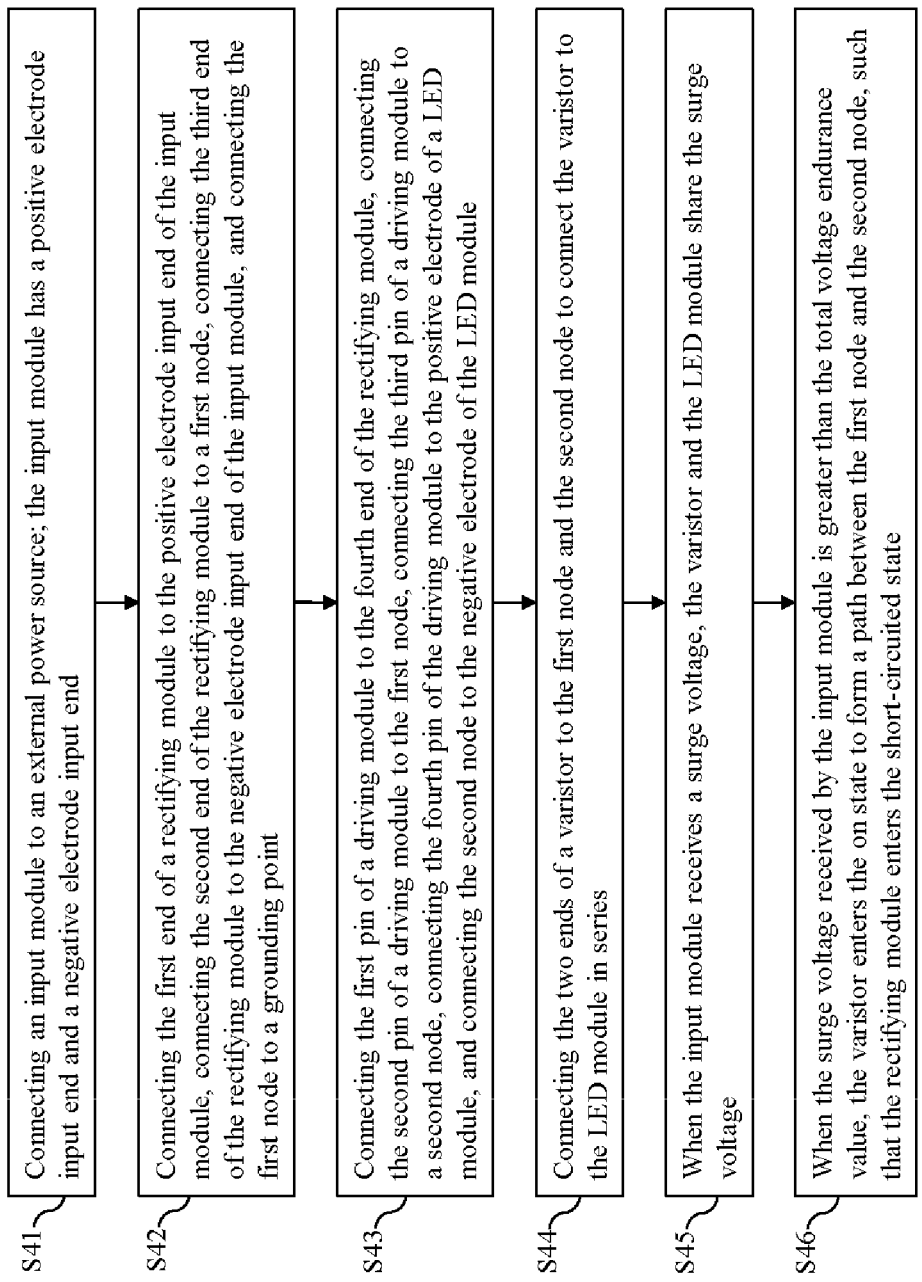
FIG. 4 is a flow chart of a lighting device protecting method in accordance with one embodiment of the present invention.

Please refer to FIG. 4, which is a flow chart of a lighting device protecting method in accordance with one embodiment of the present invention. As shown in FIG. 4, the lighting device circuit protection method according to the embodiment may include the following steps:

Step S41: connecting an input module to an external power source; the input module has a positive electrode input end and a negative electrode input end.

Step S42: connecting the first end of a rectifying module to the positive electrode input end of the input module, connecting the second end of the rectifying module to a first node, connecting the third end of the rectifying module to the negative electrode input end of the input module, and connecting the first node to a grounding point.

Step S43: connecting the first pin of a driving module to the fourth end of the rectifying module, connecting the second pin of a driving module to the first node, connecting the third pin of a driving module to a second node, connecting the fourth pin of the driving module to the positive electrode of a LED module, and connecting the second node to the negative electrode of the LED module.

Step S44: connecting the two ends of a varistor to the first node and the second node to connect the varistor to the LED module in series.

Step S45: when the input module receives a surge voltage, the varistor and the LED module share the surge voltage. As shown in FIG. 2, the total voltage endurance voltage of the circuit module formed by connecting the varistor RV to the LED module LD in series is the sum of the voltage endurance value of the varistor RV and the clamping voltage of the LED module LD. When the input module PD receives a surge voltage, the clamping voltage of the LED module LD can bear a part of the surge voltage, such that the varistor RV and the LED module LD can share the surge voltage. Therefore, the lighting device protection circuit 1 can achieve high total voltage endurance value even if the voltage endurance value of the varistor RV thereof is low. Accordingly, the lighting device protection circuit 1 can effectively suppress the surge voltage and decrease the cost thereof. Thus, the lighting device protection circuit 1 can definitely conform to actual requirements.

Step S46: when the surge voltage received by the input module is greater than the total voltage endurance value, the varistor enters the on state to form a path between the first node and the second node, such that the rectifying module enters the short-circuited state. As shown in FIG. 3, when the input module PD of the lighting device protection circuit 1 receives the surge voltage and the surge voltage is greater than the total voltage endurance value, the varistor RV can enter the on state so as to form the path is formed between the first node N1 and the second node N2. Then, the rectifying module RD enters the short-circuited state. Therefore, the safety of the lighting device protection circuit 1 can be enhanced and the lighting device protection circuit 1 can be more comprehensive in use.

The embodiment just exemplifies the present invention and is not intended to limit the scope of the present invention; any equivalent modification and variation according to the spirit of the present invention is to be also included within the scope of the following claims and their equivalents.

Although the operations of the method (s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the lighting device protection circuit includes an input module, a rectifying module, a driving module and a varistor. The varistor is connected to a LED module in series. Thus, the total voltage endurance voltage of the circuit module formed by connecting the varistor to the LED module in series is the sum of the voltage endurance value of the varistor and the clamping voltage of the LED module. When the input module receives a surge voltage, the clamping voltage of the LED module can bear a part of the surge voltage, such that the varistor and the LED module can share the surge voltage. Therefore, the lighting device protection circuit can achieve high total voltage endurance value even if the voltage endurance value of the varistor thereof is low. Accordingly, the lighting device protection circuit can effectively suppress the surge voltage.

Also, according to one embodiment of the present invention, the varistor of the lighting device protection circuit is connected to the LED module in series. Therefore, the clamping voltage of the LED module can bear a part of the surge voltage, such that the varistor and the LED module can share the surge voltage. As a result, the lighting device protection circuit can achieve high total voltage endurance value even if the voltage endurance value of the varistor thereof is low. Therefore, the cost of the lighting device protection circuit can be greatly decreased.

Further, according to one embodiment of the present invention, the varistor of the lighting device protection circuit is connected to the LED module in series. Thus, the clamping voltage of the LED module can bear a part of the surge voltage, such that the varistor and the LED module can share the surge voltage. Thus, the lighting device protection circuit can achieve high total voltage endurance value even if the voltage endurance value of the varistor thereof is low, which can effectively avoid that the lighting device protection circuit and the electronic components of the lighting device are burned out. Thus, the safety of the lighting device protection circuit can be enhanced, so the lighting device protection circuit can meet actual requirements.

Moreover, according to one embodiment of the present invention, when the input module of the lighting device protection circuit receives the surge voltage and the surge voltage is greater than the total voltage endurance value, the varistor can enter the on state to form a path between the first node and the second node. Thus, the rectifying module can enter the short-circuited state. The above mechanism can effectively avoid that the lighting device protection circuit and the electronic components of the lighting device are burned out due to high surge voltage. Therefore, the safety of the lighting device protection circuit can be further enhanced.

Furthermore, according to one embodiment of the present invention, the design of the lighting device protection circuit is simple, so the lighting device protection circuit can achieve the desired technical effects without significantly increasing the cost thereof.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device protection circuit having high voltage endurance ability, comprising:
    an input module connected to an external power source, and comprising a positive electrode input end and a negative electrode input end;
    a rectifying module having a first end, a second end, a third end and a fourth end, wherein the first end is connected to the positive electrode input end, the second end is connected to a first node, the third end is connected to the negative electrode input end, and the first node is connected to a grounding point;
    a driving module having a first pin, a second pin, a third pin and a fourth pin, wherein the first pin is connected to the fourth end of the rectifying module, the second pin is connected to the first node, the third pin is connected to a second node, the fourth pin is connected to a positive electrode of a light-emitting diode module, and the second node is connected to a negative electrode of the light-emitting diode module; and
    a varistor connected to the light-emitting diode module in series, wherein two ends of the varistor are connected to the first node and the second node respectively, wherein a total voltage endurance value of a circuit module formed by connecting the varistor to the light-emitting diode module in series is a sum of a voltage endurance value of the varistor and a clamping voltage of the light-emitting diode module, and wherein the clamping voltage of the light-emitting diode module bears a portion of a surge voltage to effectively prevent electronic components of the lighting device protection circuit from being burnt out due to over-high surge voltage, thus improving safety of the lighting device protection circuit.

2. The lighting device protection circuit having high voltage endurance ability as claimed in claim 1, wherein when a surge voltage received by the input module is greater than the total voltage endurance value, the varistor enters an on state, whereby a path is formed between the first node and the second node, and the rectifying module enters a short-circuited state.

3. The lighting device protection circuit having high voltage endurance ability as claimed in claim 1, further comprising a fuse disposed between the first end of the rectifying module and the positive electrode input end of the input module.

4. The lighting device protection circuit having high voltage endurance ability as claimed in claim 1, wherein the varistor is a symmetric varistor or a non-symmetric varistor.

5. The lighting device protection circuit having high voltage endurance ability as claimed in claim 1, wherein the rectifying module is a bridge rectifier.

6. The lighting device protection circuit having high voltage endurance ability as claimed in claim 1, wherein the driving module is a light-emitting diode driver.

7. The lighting device protection circuit having high voltage endurance ability as claimed in claim 1, wherein the light-emitting diode module is a light-emitting diode or a light-emitting diode array.

8. The lighting device protection circuit having high voltage endurance ability as claimed in claim 1, wherein the light-emitting diode module comprises a plurality of light-emitting diodes connected to each other in series.

9. The lighting device protection circuit having high voltage endurance ability as claimed in claim 1, wherein the external power source is a utility power.

* * * * *